(12) United States Patent
Stucky et al.

(10) Patent No.: US 7,653,506 B2
(45) Date of Patent: Jan. 26, 2010

(54) TENSILE SUPPORT STRENGTH MONITORING SYSTEM AND METHOD

(75) Inventors: Paul A. Stucky, Stockton, CA (US); William A. Veronesi, Hartford, CT (US)

(73) Assignee: Otis Elevator Company, Farmington, CT (US)

( * ) Notice: Subject to any disclaimer, the term of this patent is extended or adjusted under 35 U.S.C. 154(b) by 236 days.

(21) Appl. No.: 10/598,220

(22) PCT Filed: Mar. 16, 2004

(86) PCT No.: PCT/US2004/007903

§ 371 (c)(1), (2), (4) Date: Aug. 22, 2006

(87) PCT Pub. No.: WO2005/094250

PCT Pub. Date: Oct. 13, 2005

(65) Prior Publication Data

US 2007/0170012 A1 Jul. 26, 2007

(51) Int. Cl.
*G01R 27/28* (2006.01)

(52) U.S. Cl. .................................................. 702/120

(58) Field of Classification Search ................ 702/120; 324/693, 232; 182/18
See application file for complete search history.

(56) References Cited

U.S. PATENT DOCUMENTS 5,570,017 A * 10/1996 Blum ......................... 324/232

7,123,030 B2 * 10/2006 Robar et al. ................. 324/693
7,182,174 B2 * 2/2007 Parrini et al. .................. 182/18

FOREIGN PATENT DOCUMENTS

| DE | 39 34 654 A1 | 5/1991 |
| EP | 1 357 073 A1 | 10/2003 |
| WO | WO 00/58706 | 10/2000 |

OTHER PUBLICATIONS

International Search Report and Written Opinion of the International Searching Authority for International application No. PCT/US04/07903 mailed Jun. 11, 2008.
International Preliminary Report on Patentability for International application No. PCT/US04/07903 mailed Aug. 14, 2008.

* cited by examiner

*Primary Examiner*—Tung S Lau
*Assistant Examiner*—Xiuquin Sun
(74) *Attorney, Agent, or Firm*—Carlson, Gaskey & Olds PC

(57) ABSTRACT

A system and method monitoring the health of a support structure for an elevator based on an electrical characteristic, such as resistance, of the support structure and not the temperature of the structure. The resistance of a virgin support structure under the same temperature conditions as the support structure being monitored is calculated and subtracted from the measured resistance of the monitored support structure. The resistance value of the virgin support structure and the monitored support structure may be translated to a reference temperature to simplify calculations and monitoring of the support structure.

19 Claims, 3 Drawing Sheets

TENSILE SUPPORT STRENGTH MONITORING SYSTEM AND METHOD

FIELD OF THE INVENTION

The present invention is related to elevator monitoring systems, and more particularly to a system that detects the amount of wear in a tensile support structure for an elevator.

DESCRIPTION OF RELATED ART

Tensile support structures, such as coated steel belts or wire ropes, are often used in elevator systems to support elevator cars within a hoistway. Over time, the normal bending of the ropes or wires associated with cab and counterweight movement produces wear. This weak reduces the cross section of ropes or cords within the tensile support structure and weakens the support structure. It is therefore desirable to monitor the health of the support structure regularly to detect when the structure needs to be replaced.

One way in which cord health can be checked is by monitoring an electrical characteristic, such as the electrical resistance, of the cords in the support structure. The reduction of cross-sectional area in the cord due to wear will increase the resistance of the cord, theoretically making it possible to use cord resistance measurements as the basis of a cord strength or cord health indicator and set a resistance threshold at which the support structure should be replaced.

However, temperature fluctuations in the elevator hoistway will affect the cord resistance as well. For example, the temperature at the top of the hoistway can be as much as 10 to 20 degrees Celsius higher than the temperature at the bottom of the hoistway. Because electrical resistance is also a function of temperature, the variations in the cord resistance due to temperature fluctuations may be so large that it is impossible to determine how much of a resistance variation is due to temperature and how much is due to actual cord wear. In other words, resistance changes caused by temperature may mask the resistance changes due to wear, malting it virtually impossible to link resistance with cord health accurately.

There is a desire for an elevator support structure monitoring system that can eliminate the effect of temperature variations on the characteristic being monitored.

SUMMARY OF THE INVENTION

The present invention is directed to a system and method for monitoring the health of a support structure for an elevator based on an electrical characteristic, such as resistance of the support structure. One embodiment of the invention compensates for the effect of temperature on the electrical characteristic, isolating the measured electrical characteristic so that it more accurately reflects the amount of wear in the structure and not the temperature of the structure.

In one embodiment, a plurality of temperature sensors measure the temperature at different locations along an elevator hoistway. The resistance of a virgin support structure under the same temperature conditions as the support structure being monitored is calculated and subtracted from the measured resistance of the monitored support structure. The calculated difference reflects the resistance change due to wear in the support structure.

In another embodiment, a single temperature sensor is used to isolate the effect of wear on the resistance of the support structure. Using a single temperature sensor in the system simplifies calculating the resistance due to wear. The resistance value of the virgin support structure and the monitored support structure may be translated to a reference temperature to simplify calculations and monitoring of the support structure even further.

DETAILED DESCRIPTION OF THE EMBODIMENTS

Figure 1:
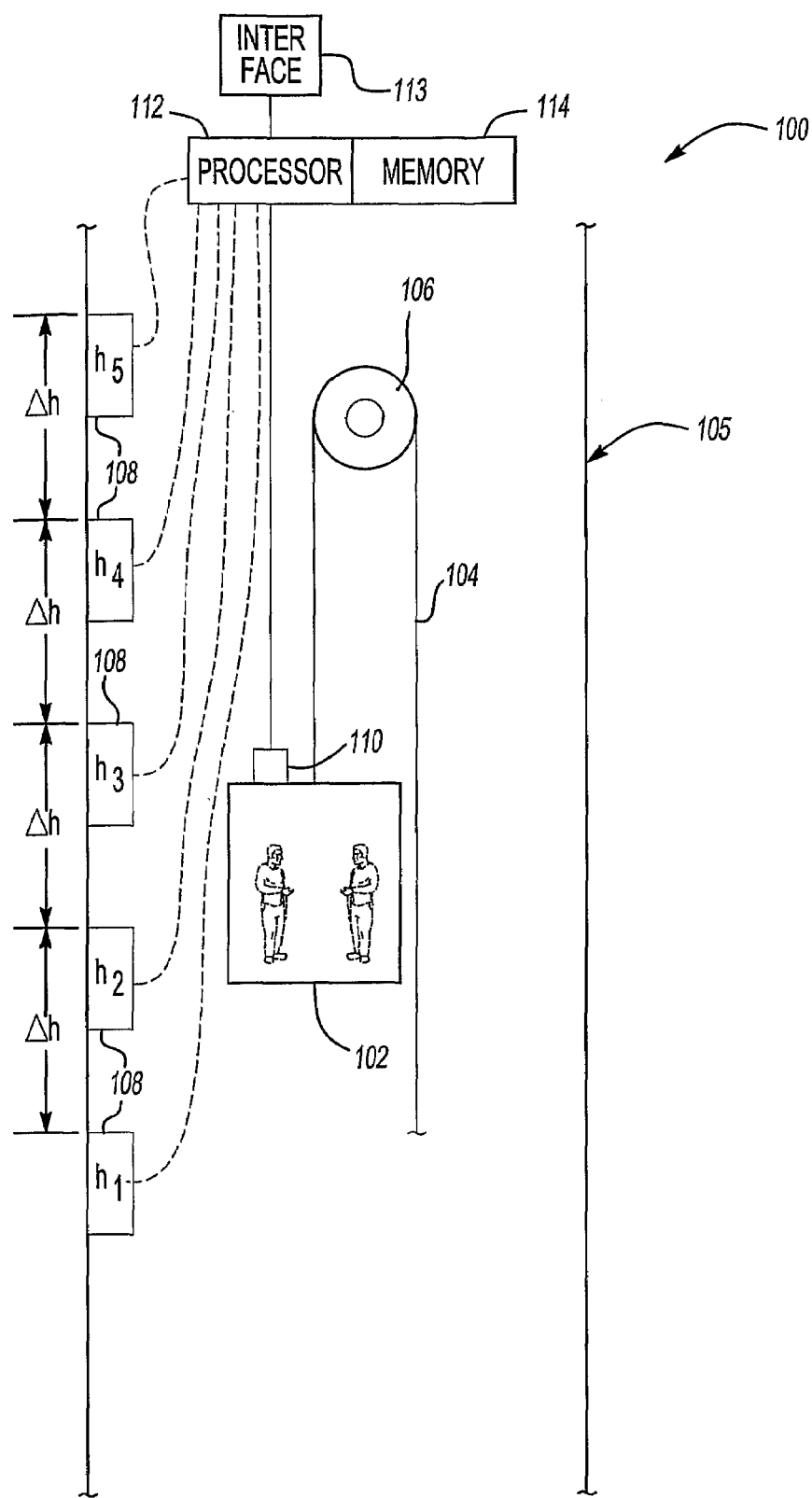
FIG. 1 is a representative diagram of an elevator system incorporating one embodiment of the invention.

FIG. 1 is a representative diagram of an elevator system 100 incorporating one embodiment of the invention. The system 100 includes an elevator car 102 supported by a tensile support structure 104, such as a belt within a hoistway 105. The support structure 104 is routed over one or more pulleys 106. The pulley 106 configuration can be any configuration known in the art and appropriate for the elevator system 100 (e.g., a 1-to-1 roping, a 2-to-1 roping, etc.).

One or more temperature sensors 108 are disposed vertically along the hoistway 105. In one embodiment, the temperature sensors 108 are at equally-spaced vertical positions $h_i$ along the hoistway, where $\Delta h$ is the distance between the sensors. The spacing between sensors 108 can vary, but a constant spacing makes calculation of the relationship between the resistance and the cord health somewhat simpler. In another embodiment, the hoistway may have only one sensor 108 in the hoistway 105, such as near the top of the hoistway 105. These temperature sensors 108 are used to conduct temperature compensation of any readings of the electrical characteristic of the support structure 104.

One or more electrical characteristic sensors 110 measure an electrical characteristic, such as resistance or conductivity, of the support structure 104. The electrical characteristic sensors 110 can be disposed at any location in the elevator system 100. Although the example below assumes that the electrical characteristic sensors 110 measure resistance, other electrical characteristics can be measured and used in the calculations without departing from the scope of the invention.

A processor 112 receives signals from the temperature sensors 108 and resistance sensors 110. Based on the data from the temperature sensors 108, the processor 112 can normalize the data from the resistance sensors 110, thereby isolating resistance changes due to actual wear in the support structure 104 and reducing or eliminating the effect of temperature changes in the resistance data. A user interface 113 provides information about the system 100 in any user-detectable form (e.g., visual, audible, or both).

If the system 100 includes only one temperature sensor 108, the processor 112 will assume that the temperature reading of the sensor 108 is the temperature of the entire hoistway or that the temperature reading defines an assumed temperature profile or gradient. This assumption is, of course, an approximation, but it can yield acceptable results.

Figure 2:
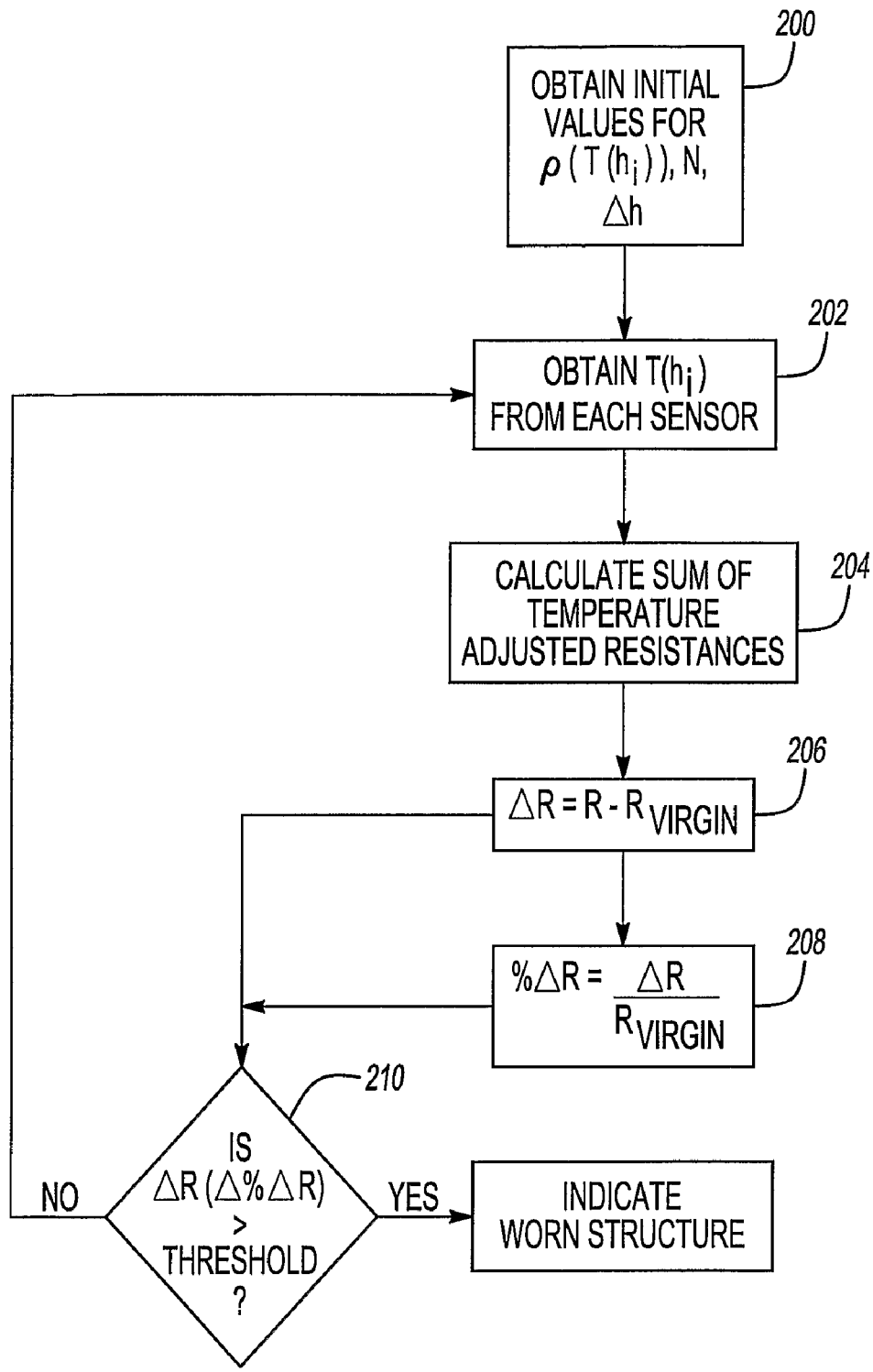
FIG. 2 is a flow diagram illustrating a process according to one embodiment of the invention.

FIG. 2 is a flow diagram illustrating a method of normalizing resistance data according to one embodiment of the invention. As is known in the art, the resistance of a metallic cord generally varies linearly with respect to temperature as well as with respect to the cross-sectional geometry of the cord. The relationship between the resistance of the cord and its cross-sectional area is $R=\rho L/A$, wherein R is the total cord resistance (Ohms), $\rho$ is the bulk resistivity of the cord material (Ohm-meters), L is the total length of the cord (meters) and A is the cross-sectional area of the cord (sq. meters).

The embodiment shown in FIG. 2 assumes that there are a plurality of temperature sensors 108 spaced along the hoistway 105. Before any processing takes place, various initial values (block 200) are stored in a memory 114 coupled to the processor 112. These initial values include the resistance per unit length of virgin cord and its variation with respect to temperature, the number of temperature sensors 108 in the hoistway 105, the distance between each temperature sensor $h_i$ and the roping configuration of the support structure 104 in the hoistway 105. Although the resistance of virgin cord is ideally approximated by $R=\rho L/A$ with $\rho$, L and A all being constant, the variations in temperature along the hoistway 105 and the variations in wear along the length in the support structure 104 will cause the resistance reading to vary along the length of the support structure 104 as well. In this case, the total electrical resistance of a given cord in the support structure 104 is best approximated by the following equation:

$$R = \int_0^L \frac{\rho(T(z))}{A(z)} dz \ (InOhms) \quad \text{Equation 1}$$

where the integration is conducted along the length L of the support structure 104. Thus, an estimated total resistance of a virgin cord under the same temperature conditions can be expressed as:

$$R_{virgin} = \frac{1}{A_{virgin}} \int_0^L \rho(T(z)) dz \quad \text{Equation 2}$$

As can be seen in Equation 2, the cross-sectional area of the virgin cord, $A_{virgin}$, is assumed to be constant along the length of the support structure 104.

The data sent to the processor 112 at any given time are the temperature readings from the temperature sensors 108 and the current cord resistance from the resistance sensors 110. The difference between the resistance R in the cord being monitored and the resistance $R_{virgin}$ in the virgin cord can be expressed as follows:

$$\Delta R = R - R_{virgin} = \frac{1}{A_{virgin}} \int_0^L \left[\frac{A_{virgin}}{A(z)} - 1\right] \rho(T(a)) dz. \quad \text{Equation 3}$$

Note that Equations 1 and 2 both calculate total resistance over the same temperature conditions; thus, the effect of temperature on the resistance reading R is eliminated in Equation 3, leaving $\Delta R$ to reflect only the resistance change due to wear in the cord.

Note that Equations 1 through 3 assume that the temperature function T(z) through the hoistway is continuous. As a practical matter, however, the hoistway will contain only a finite number N of temperature sensors 108 that are preferably spaced along positions $h_i$ at a uniform distance $\Delta h$ from each other, as shown in FIG. 1. Note that the temperature sensors 108 may also be spaced at non-uniform distances from each other without departing from the scope of the invention. Thus, the integral in Equation 3 can be approximated by a sum, resulting in the following expression:

$$\Delta R = R - R_{virgin} \approx R - \frac{K \Delta h}{A_{virgin}} \sum_{i=1}^N c_i \rho(T(h_i)) \quad \text{Equation 4}$$

where $c_i$ is selected according to any known mathematical integral approximation, such as Simpson's rule or the trapezoidal rule. As is known in the art, $c_i$ may be 1 or 0.5 depending on the rule used and the value for i (e.g., if i is equal to 1 or N, $c_i$ may be 0.5 if the trapezoidal rule is used to conduct the approximation in Equation 4). Note that if the spacing between temperature sensors 108 is not uniform, those of skill in the art would know how to modify Equation 4 to accommodate this difference.

The constant K in Equation 4 may be included to take any excess length of the support structure beyond the height of the hoistway 105 into account. The actual excess length can vary depending on, for example, the roping configuration and/or the elevator height. In most cases, the value of K is negligible and can be ignored because the excess length is a small percentage of the total support structure length. In one embodiment, K is equal to 1 in a 1:1 roping configuration and K is equal to 2 in a 2:1 roping configuration. Of course, other values for K may be used as well.

Thus, based on the above equations, the processor 112 obtains the temperature values $T(h_i)$ from each temperature sensor N (block 202), calculates the sum shown in Equation 4 (block 204), and then subtracts the sum from the measured resistance value R to obtain a value for $\Delta R$ (block 206). If desired, the measured resistance value R can be divided by the virgin resistance value $R_{virgin}$ to obtain the percentage change in resistance value due to loss of cross-sectional area (block 208). The resistance change $\Delta R$ and/or the percentage change can be compared with a threshold value to evaluate the health of the support structure (block 210).

To simplify calculations, the sensing system may include only one temperature sensor 108 in the hoistway 105. In one embodiment, the temperature sensor 108 is located near the top of the hoistway 105. Because there is only one temperature sensor value to take into account, the resistance calculation can be simplified to obtain:

$$\Delta R = R - R_{virgin} \approx R - \frac{\rho(T(H))L}{A_{virgin}} = R - R_{virgin}(T(H)) \quad \text{Equation 5}$$

where H is the length of the hoistway, L is the length of the support structure 104, and T(H) is the sensed hoistway temperature. When compared with Equation 4, H in Equation 5 can be construed as corresponding to (N−1) dh and L can be construed as corresponding to KH. If Equation 5 is used to monitor support structure health, the resistance values $R_{virgin}$ of virgin structures at various temperatures T(H) may be stored as a look-up table so that the processor 112 can reference the correct value of $R_{virgin}$ to subtract from the resistance reading R for a given temperature T(H).

To translate the measured resistance value R and the virgin resistance value $R_{virgin}$ (T(H)) to a chosen reference temperature, both the measured resistance R and the virgin resistance R(T(H)) can be divided by a ratio $\rho(T_0)/\rho(T(H))$, where $T_0$ is a selected reference temperature. The reference temperature $T_0$ is preferably selected to be close to room temperature to make it easier to obtain the virgin support structure resistance value $R'_{virgin}(T_0)$ for use by the processor 112. Further, translating the resistance values R and $R_{virgin}$ to corresponding values at a given reference temperature $T_0$ allow support structure health to be evaluated using a single value for $R_{virgin}$ and a single resistance threshold rather than different values for each temperature.

After dividing by the ratio, the resistance difference at the reference temperature $T_0$ can be expressed by:

$$\Delta R' = \frac{\rho(T_o)}{\rho(T(H))}[R - R_{virgin}] \approx R' - \frac{\rho(T_o)L}{A_{virgin}} = R' - R'_{virgin}(T_o) \quad \text{Equation 6}$$

As can be seen in Equation 6, the translated resistance difference $\Delta R'$ can be approximated by subtracting the translated measured resistance R' with the virgin resistance $R'_{virgin}$ at the reference temperature.

Although Equations 5 and 6 serve as approximations, they are accurate enough for monitoring cord health because they still reduce the effects of temperature on the resistance reading R enough to isolate the resistance changes due to changes in the cord cross-sectional area. In empirical testing using example embodiments of the invention, the difference between calculations using only one temperature sensor 108 and those using multiple temperature sensors 108 is on the order of 3%, which is an amount of error that is manageable by the appropriate selection of retirement criteria and is acceptable in view of the added complexity of multiple sensors.

Figures 3, 4:
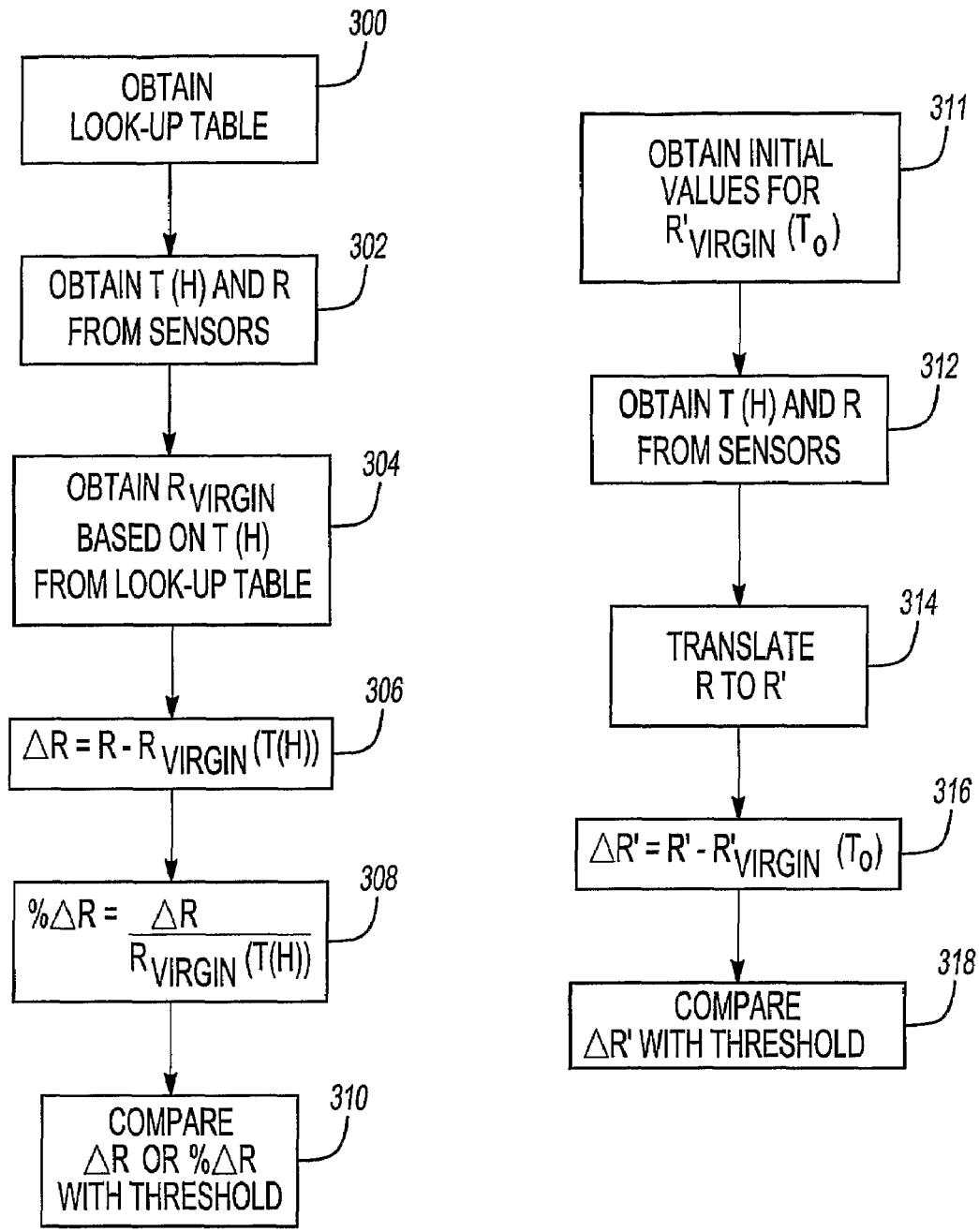
FIG. 3 is a flow diagram illustrating a process according to another embodiment of the invention.
FIG. 4 is a flow diagram illustrating a process according to yet another embodiment of the invention.

FIGS. 3 and 4 illustrates two alternative embodiments that may be conducted if the hoistway has only one temperature sensor 108. In the embodiment shown in FIG. 3, the processor obtains a look-up table containing total cord resistance values for virgin cord as a function of temperature. The processor 112 then obtains the temperature reading T(H) from the temperature sensor 108 and a resistance reading R from the electrical characteristic sensor 110 (block 302). In this embodiment, the processor 112 treats the temperature reading T(H) as if it were the temperature for the entire hoistway.

The processor 112 then selects a value for $R_{virgin}$ based on the temperature reading T(H) (block 304) and then subtracts $R_{virgin}$ from the resistance reading R to obtain $\Delta R$ (block 306). If desired, the resistance difference $\Delta R$ can be divided by the virgin resistance value $R_{virgin}$ to obtain the percent change in the resistance due to support structure wear (block 308). $\Delta R$ or the percent change in the resistance value can then be compared with a threshold resistance value (block 310).

In the alternative embodiment shown in FIG. 4, initial values stored in the system 100 include the virgin resistance at the reference temperature $R'_{virgin}$ ($T_0$). In this embodiment, the processor 112 obtains an initial value for $R'_{virgin}$ ($T_0$) (block 311). After obtaining the temperature value T(H) and resistance value R (block 312), the processor 112 can translate the measured resistance value R to an equivalent measured resistance value R' at the reference temperature $T_0$ before conducting any evaluations (block 314). In this case, no look-up table is needed for the virgin resistance value $R'_{virgin}$ ($T_0$) because $R'_{virgin}$ ($T_0$) will always be the same for a given $T_0$. Once the translated measured resistance value R' has been obtained, the virgin resistance value at the reference temperature $R'_{virgin}$ ($T_0$) is subtracted from the translated value R' to obtain the translated resistance difference $\Delta R'$ (block 316). This translated resistance difference $\Delta R'$ is then compared with a threshold value to evaluate support structure health (block 318).

In all of the embodiments described above, changes in the detected temperature to a new temperature may initiate recalculation of the translated resistance to reflect the new temperature. Further, although the examples above focus on translating the virgin resistance to reflect the temperature measured in the hoistway, both the virgin resistance and/or the measured resistance can be translated so long as the virgin and measured resistances are evaluated based on the same reference temperature.

By compensating for the effect of temperature variations on the electrical characteristic being monitored, the invention ensures that variations reflected in the electrical characteristic are due to wear in the support structure. Thus, the electrical characteristic can be directly correlated with support structure health and be used as a way to monitor and assess the remaining strength in the structure. This allows, for example, a single threshold to be set indicating that the structure needs to be replaced, regardless of any temperature variations in the hoistway.

It should be understood that various alternatives to the embodiments of the invention described herein may be employed in practicing the invention. It is intended that the following claims define the scope of the invention and that the method and apparatus within the scope of these claims and their equivalents be covered thereby.

We claim:

1. A support structure monitoring system for an elevator, comprising:
    at least one temperature sensor disposed in a hoistway;
    a characteristic sensor that obtains a measured electrical characteristic of at least one portion of the support structure; and
    a processor that translates at least one of the measured electrical characteristic and an electrical characteristic of at least one portion of a virgin support structure to correspond with a reference temperature to reflect an effect of a temperature in the hoistway as indicated by said at least one temperature sensor, wherein a value corresponding to the measured electrical characteristic is a measured value and a value corresponding to the electrical characteristic of the virgin support structure is a reference value,
    wherein the processor calculates a difference between the measured value and the reference value and compares a value corresponding to the difference with a predetermined threshold to determine a support structure condition.

2. The system of claim 1, wherein the processor calculates the reference value by translating the electrical characteristic of said at least one portion of the virgin support structure, wherein the reference temperature is equal to the temperature in the hoistway as indicated by said at least one temperature sensor and the measured value is equal to the measured electrical characteristic.

3. The system of claim 1, wherein the processor detects a temperature change in said at least one sensor to a new temperature and recalculates the reference value based on the new temperature.

4. The system of claim 1, wherein the processor divides a difference between the measured value and the reference value by the reference value to obtain a percent change value, which acts as the value corresponding to the difference, and wherein the processor indicates a worn support structure if the percent change value exceeds the predetermined threshold.

5. The system of claim 1, wherein the value corresponding to the difference is the difference itself between the measured value and the reference value, and wherein the processor indicates a worn support structure if the difference exceeds the predetermined threshold.

6. The system of claim 1, wherein said at least one temperature sensor comprises a plurality of temperature sensors, and wherein the processor calculates the reference value based on temperature readings obtained from the plurality of temperature sensors.

7. The system of claim 6, wherein the plurality of temperature sensors are spaced a uniform distance from each other along the hoistway.

8. An elevator support structure assembly, comprising:
at least one temperature sensor;
a characteristic sensor that obtains a measured electrical characteristic of at least one portion of the elevator support structure; and
a processor that
determines a temperature associated with at least one portion of the elevator support structure from said at least one temperature sensor, and
translates at least one of the measured electrical characteristic and an electrical characteristic of at least one portion of a virgin support structure to correspond with a reference temperature to reflect an effect of a temperature as indicated by said at least one temperature sensor, wherein a value corresponding to the measured electrical characteristic is a measured value and a value corresponding to the electrical characteristic of the virgin support structure is a reference value, and
calculates a difference between the measured value and the reference value and compares a value corresponding to the difference with a predetermined threshold to determine a support structure condition.

9. The assembly of claim 8, further comprising a user interface that indicates that the elevator support structure is worn if the difference exceeds a predetermined threshold.

10. The assembly of claim 8, wherein the processor calculates the reference value by translating the electrical characteristic of said at least one portion of the virgin support structure, wherein the reference temperature is equal to the temperature in the hoistway as indicated by said at least one temperature sensor and the measured value is equal to the measured electrical characteristic.

11. The assembly of claim 8, wherein the processor divides the difference between the measured value and the reference value by the reference value to obtain a percent change value, which acts as the value corresponding to the difference, and wherein the processor indicates a worn support structure if the percent change value exceeds the predetermined threshold.

12. The assembly of claim 8, wherein said at least one temperature sensor comprises a plurality of temperature sensors uniformly spaced with respect to each other along the hoistway.

13. A method of monitoring an elevator support structure condition, comprising:
measuring a temperature associated with at least a portion of the support structure;
obtaining a measured electrical characteristic of at least one portion of the support structure;
translating at least one of the measured electrical characteristic and an electrical characteristic of at least one portion of a virgin support structure to reflect an effect of the measured temperature, wherein a value corresponding to the measured electrical characteristic is a measured value and a value corresponding to the electrical characteristic of the virgin support structure is a reference value;
calculating by a processor a difference between the measured value and the reference value; and
comparing by a processor a value corresponding to the difference with a predetermined threshold to determine a support structure condition.

14. The method of claim 13, wherein the support structure comprises a plurality of portions, wherein the step of determining the temperature comprises obtaining a plurality of temperature values, each temperature value associated with a different portion in the support structure,
and wherein the step of determining the reference value comprises translating the electrical characteristic of each portion of the virgin support structure based on the temperature of that portion and summing the translated electrical characteristics of the portions of the virgin support structure.

15. The method of claim 13, wherein the translating step determines the reference value by translating the electrical characteristic of said at least one portion of the virgin support structure, wherein the reference temperature is equal to the measured temperature and the measured value is equal to the measured electrical characteristic.

16. The method of claim 13, further comprising obtaining a percent change value based on the reference value, wherein the indicating step indicates a worn support structure if the percent change value exceeds the predetermined threshold.

17. The method of claim 13, wherein the step of determining the reference value comprises determining the electrical characteristic of at least a portion of the support structure in a known condition at a plurality of temperatures.

18. The method of claim 17, wherein the known condition is a virgin support structure condition.

19. The method of claim 13, wherein the electrical characteristic is resistance.

* * * * *

UNITED STATES PATENT AND TRADEMARK OFFICE
CERTIFICATE OF CORRECTION

PATENT NO. : 7,653,506 B2
APPLICATION NO. : 10/598220
DATED : January 26, 2010
INVENTOR(S) : Stucky et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 291 days.

Signed and Sealed this

Twenty-third Day of November, 2010

David J. Kappos
*Director of the United States Patent and Trademark Office*